(12) United States Patent
Truebenbach et al.

(10) Patent No.: US 7,343,279 B2
(45) Date of Patent: Mar. 11, 2008

(54) UNIVERSAL APPROACH FOR SIMULATING, EMULATING, AND TESTING A VARIETY OF SERIAL BUS TYPES

(75) Inventors: Eric L. Truebenbach, Sudbury, MA (US); Michael McGoldrick, North Reading, MA (US); Tung L. Ng, Malden, MA (US); Evgeny Polyakov, Brookline, MA (US)

(73) Assignee: Teradyne, Inc., North Reading, MA (US)

( * ) Notice: Subject to any disclaimer, the term of this patent is extended or adjusted under 35 U.S.C. 154(b) by 804 days.

(21) Appl. No.: 10/325,070

(22) Filed: Dec. 20, 2002

(65) Prior Publication Data

US 2004/0128121 A1   Jul. 1, 2004

(51) Int. Cl.
*G06F 9/455* (2006.01)
*G06F 11/00* (2006.01)

(52) U.S. Cl. ......................................... 703/27; 700/100
(58) Field of Classification Search ................. 703/27, 703/21, 15, 3; 710/1, 100, 105, 106, 300, 710/305–307, 8; 709/237, 238, 253; 714/100, 714/699, 2
See application file for complete search history.

(56) References Cited

U.S. PATENT DOCUMENTS

| | | | |
|---|---|---|---|
| 5,038,317 A | 8/1991 | Callan et al. ............... 710/301 |
| 5,056,060 A | 10/1991 | Fitch et al. ..................... 710/3 |
| 5,111,450 A | 5/1992 | Cooledge et al. ........... 714/712 |
| 5,175,536 A | 12/1992 | Aschlinan et al. .......... 370/257 |
| 5,243,273 A | 9/1993 | McAulife et al. ........... 714/724 |
| 5,257,393 A | 10/1993 | Miller ......................... 709/224 |
| 5,263,149 A | 11/1993 | Winlow ....................... 703/15 |
| 5,349,685 A | 9/1994 | Houlberg ..................... 712/40 |
| 5,410,717 A | 4/1995 | Floro .......................... 710/104 |
| 5,440,697 A | 8/1995 | Boegel et al. ................ 703/21 |
| 5,615,136 A | 3/1997 | Baraton et al. ............... 703/21 |
| 5,970,430 A * | 10/1999 | Burns et al. ................. 702/122 |
| 6,618,774 B1 * | 9/2003 | Dickens et al. .............. 710/64 |
| 6,779,133 B2 * | 8/2004 | Whetsel ....................... 714/28 |
| 6,829,672 B1 * | 12/2004 | Deng et al. ................. 711/103 |
| 6,892,262 B1 * | 5/2005 | Taki ........................... 710/300 |
| 6,968,307 B1 * | 11/2005 | Chrysanthakopoulos ..... 703/27 |
| 2002/0083332 A1 * | 6/2002 | Grawrock ................... 713/200 |

FOREIGN PATENT DOCUMENTS

WO    WO 01/28060    4/2001

OTHER PUBLICATIONS

IEEE 1394 and the Windows Platform: The optimal PC interconnect bus for consumer electronic devies, Dec. 14, 2001.*

(Continued)

*Primary Examiner*—Paul Rodriguez
*Assistant Examiner*—Eunhee Kim
(74) *Attorney, Agent, or Firm*—Wolf, Greenfield & Sacks, P.C.

(57) ABSTRACT

An electronic apparatus for testing equipment for serial busses employs a generic bus model that breaks down a serial bus into separate layers that are managed by separate processors. The processors have parameters that can be programmed for communicating via one type of serial bus, or can be reprogrammed for communicating via another type of serial bus.

44 Claims, 3 Drawing Sheets

OTHER PUBLICATIONS

ANONYMOUS: "Reference Manual: Model 2108; VXI Serial Data System Digital Resource Module"—Online-, Aug. 2, 2001, Talon Instruments, XP002274335.

ANONYMOUS: "Application Note #2; Model 2108; 1553 Serial Bus Emulation"—Online-, 2001, Talon Instruments, XP002274336.

ANONYMOUS: "Reference Manual: Model 2108; TX01/RX01 Interconnect Modules"—Online-, Jan. 24, 2001, Talon Instruments, XP002274337.

Communication from Foreign Patent Office (3 pgs), 2004.

* cited by examiner

UNIVERSAL APPROACH FOR SIMULATING, EMULATING, AND TESTING A VARIETY OF SERIAL BUS TYPES

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable

BACKGROUND OF THE INVENTION

1. Field of the Invention

This invention relates generally to automatic test equipment for electronics, and, more particularly, to instrumentation that is adaptable for simulating, emulating, or testing a wide variety of serial bus types.

2. Description of Related Art

The digital serial link provides a popular way of communicating between electronic portions of a digital system. In a digital serial link, a transmitter sends digital data over a wire, optical fiber, or other transmission medium, to a receiver, which receives and reconstructs the original data. The serial data link can be used to communicate any kind of data, including static information, as well as programming code, control signals, and so forth.

A "serial bus" is a digital serial link that defines a structure for communications (i.e., a medium, encoding, data format, speed, and so forth). Because they communicate using a single data signal, serial busses are popular in applications where it is desirable to reduce the number of wires that interconnect different parts of a system. These applications include long-distance communications, such as digital telephony, applications where it is desirable to minimize weight, such as in airplanes and automobiles, and applications where it is desirable to use small cables having few wires, or small connectors having few contacts.

Serial busses generally involve taking digital data, serializing it, adding content for error detection and correction, if desired, modulating a signal in some way with the data (typically to optimize cost, noise immunity, power, etc.), and transmitting the data over some medium. The reverse process essentially takes place when receiving data. There are a vast number of ways of performing these functions. The large number of standard serial busses, plus the larger number of applications-specific serial busses in use, attests to the flexibility of this approach.

In addition to a single data signal, serial busses may also employ non-data support signals. These signals support the transmission of data but do not actually make up the data being transmitted. These non-data support signals commonly include:

Handshaking Signals—dedicated signals that coordinate data flow, by signaling between a transmitter and receiver that data is ready, that no more data can be accepted, or that a transmission is starting or ending;

Clocks—signals that provide timing information for the data, i.e. they qualify when a symbol on the bus is stable or ready for reception. Clocks may also provide handshaking functions by turning on and off when data is or is not ready for transmission;

Sync Signals—limited-use handshaking signals that indicate the beginning (and sometimes the end) of a data transmission;

Envelope Signals—limited-use handshaking signals that indicate when the data is valid during a transmission.

It should be noted that wireless transmissions through the air or through space are considered herein to be serial transmissions. Included in our definition of serial busses are those that encode more than one bit of data in a single symbol (the smallest unit of data). A symbol's encoding is by necessity non-binary in these instances, i.e., the bits in one symbol are represented by varying voltage amplitudes, phases, or frequencies. As long as symbols are transmitted via a single signal, a bus transmitting these symbols can qualify as a serial bus.

A myriad of different serial busses is in use today, and many of these have been developed for a single application. Modern aircraft employ hundreds of instances of serial busses and dozens of different serial bus types. So do other large systems, like automobiles, or fixed systems, like nuclear power plants. Different busses often have different ways of encoding data, timing data transmissions, providing signaling and control, providing error detection and correction, and modulating a data signal through a medium. Some busses are unidirectional; others are bidirectional. Some busses are point-to-point, others are multi-drop. Some busses include handshaking, envelope, or sync signals; others encode all of these functions in the serial data stream. Some busses provide only simple data transmission; others include in their definition higher-level functions like response times, collision detection and avoidance, retry on error, and multiple terminal broadcast.

With this wide variety of bus types and features comes a real problem of standardizing the control, test, and maintenance of serial busses. Since serial busses form the spine of many complex systems, observing and controlling serial busses is a primary way of observing and controlling the systems of which they are a part. We have recognized a need for universality in interfacing with different busses and believe that the current state of affairs can be summarized as follows:

Complex systems contain many instances and types of serial busses.

There are hundreds of standard serial busses, and untold numbers of custom serial busses in use today.

It is desirable to control these busses for testing, debugging, and controlling complex systems.

No instrument or circuit of which we are currently aware is able to interface with more than a few variations of busses, nor does any instrument appear to have the performance required to control more than a few types of busses.

Consequently, complex systems commonly incorporate several to dozens of different, independent serial bus interfaces.

Nonstandard busses often require customized interfaces, which require significant time and money to create.

We have come to believe that a highly desirable solution to this problem would be a circuit or instrument that could Control standard serial busses.

Be configured or programmed to control custom serial busses, without the requirement of creating a custom interface.

Be as easy to use as the currently available methods for these applications.

Currently, techniques for interfacing with different types of busses include (i) using an applications-specific instrument, and (ii) using a serial arbitrary waveform generator. The most common way to control a standard bus, i.e., one having a formal definition that is used in many applications, is with an "applications-specific instrument." An applications-specific instrument is an instrument or other interface that has been designed specifically to control a particular type of bus. Many such instruments are currently available for popular busses.

Applications-specific instruments are generally able to interface with a limited set of defined variations of a standard bus. For example, TIA/EIA-232 (i.e., RS-232) has multiple commonly accepted operating speeds, word lengths, and operating voltage levels. Most applications-specific instruments for RS-232 include alternate configurations that allow for a limited set of these variations. Although the instruments can select from a predefined set of variations, they do not allow control over the interface in detail. For example, RS-422 is identical to RS-232, except that it uses differential signaling that allows for longer distances and higher transmission speeds. Therefore, an instrument may incorporate both an RS-422 and an RS-232 interface, and allow a user to select one of the two. The instrument would not allow wide-ranging changes to the specification, however.

Figure 1:
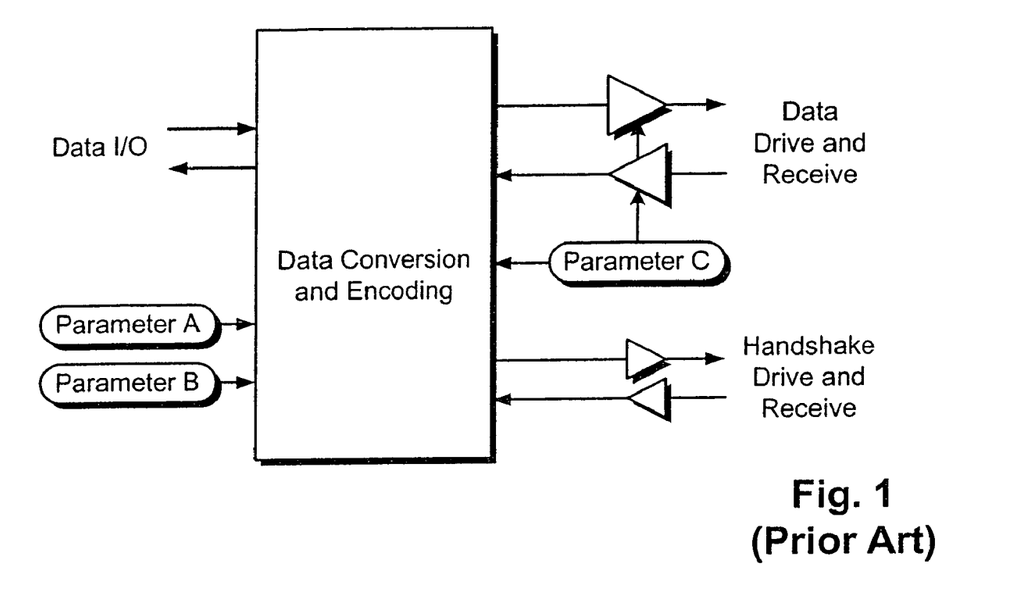
FIG. 1 is a simplified block diagram of specialized test equipment according to the prior art for testing specific types of serial busses and devices.

FIG. 1 is a simplified block diagram of an applications-specific instrument. Data flows in and out of an instrument, which processes it according to a defined bus standard. A few parameters (A, B, and C) can be statically specified to select certain bus characteristics.

The applications-specific instrument provides the advantage of ease of use. Since the instrument was designed to emulate a limited set of busses, little setup is required. The user can concentrate on the data to be sent and received, without being concerned with the bus specification. In addition, the applications-specific instrument provides some quantum of flexibility. If the instrument designer can anticipate multiple possible uses, these can be designed in and the user can select from the available variations. Every additional feature adds cost and complexity, however.

Despite these advantages, the applications-specific instrument is not truly universal. It can only emulate busses that the designer anticipated emulating at the time of design. The more busses that are emulated, the larger and more complex the instrument becomes, until it equivalently becomes several instruments. And whenever an unanticipated variation is introduced, the instrument must be redesigned if it is to emulate the variation. In summary, applications-specific instruments do not provide a universal solution for bus emulation, but they do set a standard for ease of use.

Figure 2:
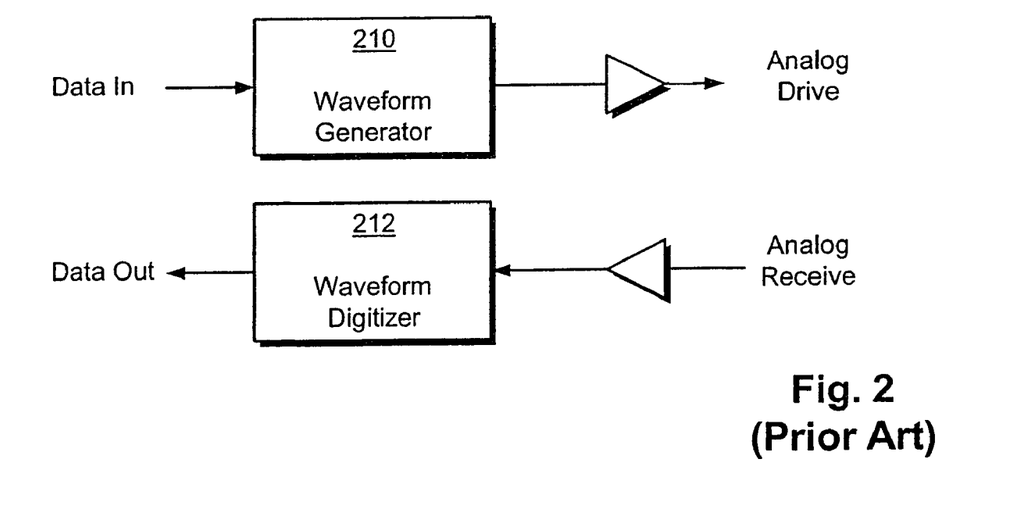
FIG. 2 is a simplified block diagram of general purpose test equipment according to the prior art for testing a wide range of different serial busses and devices.

Currently, the best flexibility in generating serial waveforms is obtained using the technique shown in FIG. 2. An arbitrary waveform generator 210, perhaps one that is optimized for serial busses, can be used to generate any serial stream within its performance limits. Similarly, a digitizer 212 can be used to capture a serial bus stream and save it for reconstruction of the digital data. This "Arb/Dig" approach is capable of generating and/or receiving data for a large number of standard and custom serial busses. It also offers the advantage that bus performance can be margined, i.e., parameters like speed, voltage levels, and slew rate can be controlled by varying the source data.

The Arb/Dig approach tends to be difficult to use, however. The serial data must generally be specified and interpreted at the analog waveform level. In addition, this technique is not as flexible as one might expect. Small changes, for example, in the number of data bits per word, can require recreating the entire analog waveform from scratch. Furthermore, this technique generally provides no real-time control. Since data transformation and analysis generally happen during pre- and post-processing from memory, the Arb/Dig approach is not inherently set up for handshaking or other real-time responses. In addition, the operative portions of the Arb/Dig implementation run at the bit rate of the input or output waveform, and thus require a large amount of high-speed circuitry. High speed circuitry translates to higher cost and higher power.

What is desired is a serial bus emulator that is capable of emulating all possible serial buses, standard or custom, within its performance envelope. It should be able to handle handshaking, syncs, clocks, and other control signals. It should be flexible for handling bus variations that are not even developed yet. The serial bus emulator should be as easy to use as a applications-specific instrument, and should be provided in a cost-effective and compact manner.

BRIEF SUMMARY OF THE INVENTION

With the foregoing background in mind, it is an object of the invention for a test apparatus to be readily configurable for performing testing over different types of serial busses.

To achieve the foregoing object, as well as other objectives and advantages, an electronic apparatus for testing equipment for serial busses employs a generic bus model that breaks down a serial bus into separate layers that are managed by separate processors. The processors have parameters that can be programmed for communicating via one type of serial bus, and can be reprogrammed for communicating via another type of serial bus.

BRIEF DESCRIPTION OF THE DRAWINGS

Additional objects, advantages, and novel features of the invention will become apparent from a consideration of the ensuing description and drawings, in which—

DETAILED DESCRIPTION OF THE PREFERRED EMBODIMENT

It is common in networks to separate the communications protocols into layers. These layers form a somewhat arbitrary division between tasks, in order to manage the complex problem of controlling network traffic. The most popular implementation is called the 7-layer Open Systems Interconnect (OSI) model. Serial buses are generally less complex but have layers of their own. The invention recognizes the existence of these layers and creates a generic "bus model" of their structure and interactions.

Figure 3:
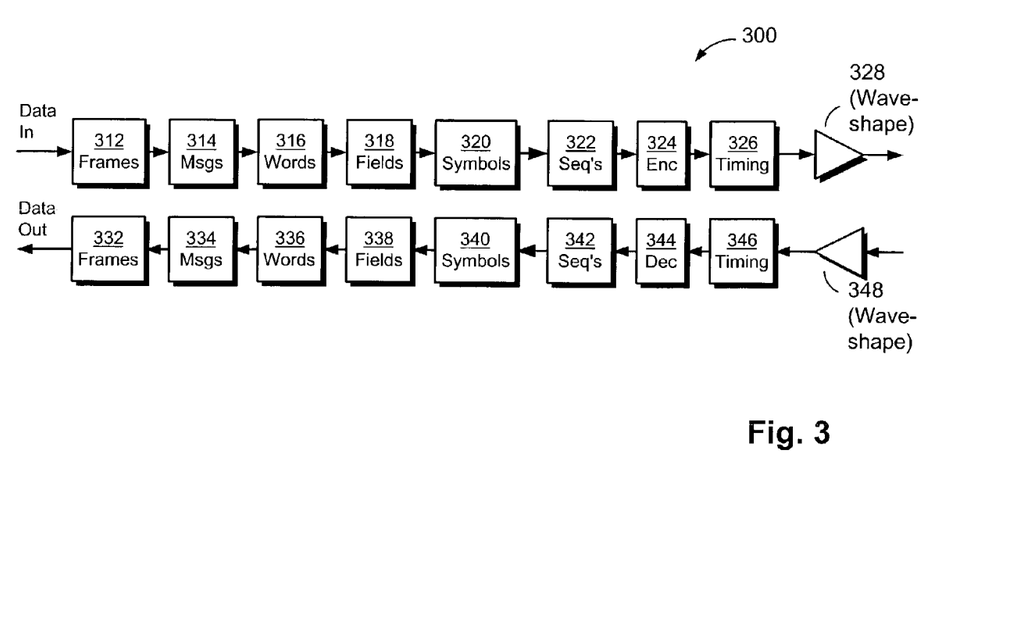
FIG. 3 is a simplified block diagram of general purpose test equipment for testing a wide range of different serial busses and devices using a bus model according to the invention.

FIG. 3 shows an illustrative embodiment of generic bus model 300 according to the invention. The bus model 300 reflects the fact that there are several operations that must be performed on data in order to transmit it over a serial bus. Substantially the same operations are performed in reverse when receiving the data. These operations are more detailed than the mere "serialization," i.e., the direct conversion of parallel data to serial data. Not all buses have all of the operations shown, but all buses have at least some of them.

Briefly, to transmit data on a serial bus, the bus generally requires that the data be grouped into "words." Some buses have higher-level groupings of multiple words, called "messages," which may in turn be grouped into "frames." Words may be broken down into "fields," each of which having a specific function, such as data carrying, error correction, synchronization, collision detection, etc. The fields each may contain one or more "symbols." Each symbol may represent one or more data bits, or some non-data information such as synchronization patterns. The form of some symbols may depend on their "sequence," i.e. the form of the symbol changes depending on the symbols that precede or follow them. Outgoing data may be "encoded" prior to transmission. An abstract representation of a symbol is then transformed into a physical "waveshape." "Timing" is applied to the waveshape, and voltage or current levels are modulated to produce the serial bit stream.

Substantially the same series of operations occurs in reverse order when receiving a serial bit stream. First the modulation is stripped off. Timing is removed, leaving a series of symbols without regard to how fast the data was moving. Each symbol is identified according to a limited set of possible symbols, which are generally specific for a bus type. Sequence dependencies are decoded and removed, and the symbols are grouped according to expected fields. Fields are grouped according to expected word formats. Finally, words may be assembled into messages, and messages into frames.

At least some of these operations associated with sending and receiving serial data are performed implicitly, in some fashion, for all serial busses. The bus model 300 recognizes these operations explicitly, categorizes and sequences them, and defines relationships between them. In particular, the bus model performs the functions of Breaking down serial bus transmissions into these or similar components Identifying variables associated with each component Ordering the components and defining their interrelationships Encapsulating all of this data into a model, that may be implemented for emulating, exercising, simulating, or testing a wide range of different serial busses.

The list of variables for each component can be extensive. For example, for each field it is required to know its length in symbols, the type of symbols it may contain, the type of information it carries (data, error correction, etc.), its position in a word, and whether it contributes to the calculations for error correction. One bus may support a variety of different word types. Different word types may support different fields. Thus, it may also be required to define different fields by word type.

The bus model 300 provides a number of advantages. It is an independent, incrementally specifiable entity. It may be stored and retrieved, and it may be edited. It may be simulated as an abstraction or an implementation. Bus characteristics may be displayed incrementally, or grouped in the various ways that they are specified in standard bus specifications, for ease of use. Since the bus model encapsulates all of the bus' operating characteristics in a finite model, a bus model may be constructed for a custom bus by simply answering a series of questions. Bus models may be constructed from the ground up, or may be specified in terms of other models, e.g. "just like RS-232 only with 20 data bits per word." A bus model allows control of the complexity of the bus specification, exposing only the parts that apply for a particular bus standard, or only those parts that the user needs to control.

Not all of the bus model's characteristics need apply to all buses. For example, some buses do not have sequence dependencies in their symbol encoding. In this case, the bus model simply reflects the lack of that dependency, or shows a "null characteristic."

In summary, the bus model has the advantage of providing a universal approach to specifying a wide range of bus behaviors. Bus behavior may grouped into parameters, for ease of maintenance and understanding. Bus behavior may be specified incrementally, or as differences from other buses. One or more bus parameters are easily margined without affecting other parameters or other parts of the model. Bus specification is independent of the instrument used to implement the bus emulator. Once parameters for a particular serial bus are programmed, the bus may be emulated just as if the interface were custom-designed for that bus.

FIG. 3 illustrates that in one embodiment bus model 300 is implemented by multiple components ordered in a chain for sequential processing on a transmitted or received bit stream. FIG. 3 shows that when transmitting data input to the bus model, processing is performed in components that may include a frame processing component 312, a message processing component 314, a word processing component 316, a field processing component 318, a symbol processing component 320, a sequence processing component 322, an encoding processing component 324, and a timing processing component 326. The output of timing processing component 326 may then be applied to a serial bus through analog driver 328. When receiving data, processing on a signal received through analog receiver 348 may be performed in components that may include a timing processing component 346, a decoding processing component 344, a sequence processing component 342, a symbol processing component 340, a field processing component 338, a word processing component 336, a message processing component 334, and a frame processing component 332.

Figure 4:
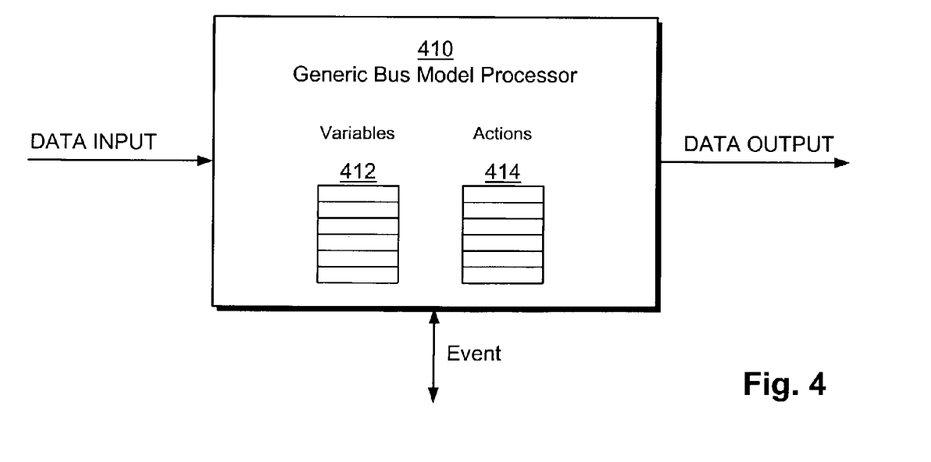
FIG. 4 is generic block diagram of a processor like the ones found in the bus model of FIG. 3.

FIG. 4 shows a simplified block diagram of a generic processor 410 of the type that is used for each of the components in the bus model. Each processor 410 has a data input for receiving data and a data output for transmitting data. A group of parameters or "variables" 412 is associated with each processor, to capture bus characteristics for the corresponding level of the bus model. Preferably, each processor 410 has an associated list of actions 414 it can perform. These actions include those to be taken in response to certain input data, handshaking or other control signals, events occurring on other processors, or events or requests originating from external equipment or instrumentation.

Preferably, each processor is concerned only with applying its limited set of parameters to its input data, and passing on its results via its output data. A "processor" may be hardware, software, or a combination of the two. What matters is that the processor match the bus model. Thus, the characteristics captured in the bus model may be directly applied to the processor, without the need for preprocessing. Individual characteristics captured in the bus model (like voltage levels or speed) may be independently controlled without affecting other characteristics.

The bus model can be used to specify a universal emulator for serial busses. A bus model can emulate any serial bus by specifying the characteristics of each of its components. By assigning a processor to each component in the model, any serial bus may be emulated by specifying the operation of each processor.

In the preferred embodiment, the processor for each component of the bus model is independent of all the other processors. Implementing the bus model with independent processors confers numerous advantages:

Allows for high performance.

Independent processors can work in parallel, assembling and disassembling serial bus streams, for highest speed.

Each processor can work on only a specified set of characteristics, allowing it to be small and streamlined.

Single parameter changes or "margining" are possible by making a change to only one processor.

Each processor can be optimized for the particular functions it performs. For instance, words need not be generated as quickly as symbols, and thus may be generated using slower, less expensive techniques. Only those processors that must be operated at high speed require high-speed implementations.

Observability and control are enhanced. By monitoring traffic between processors, a system may identify when a new symbol is generated, or a certain type of symbol is generated, when a word is received, etc. This has advantages in measuring system performance and detecting errors.

Many buses require error detection and recovery. By associating the types of errors detected with the processor that deals with that part of the bus, errors may be detected at the earliest practicable point. Timing errors are detected early, by the timing processor, which generally has the highest speed. Bus collision errors (an incorrect voltage level or symbol) are detected near the receiver input, not at the end of the chain.

Error injection. By varying the parameters dynamically, errors may be injected at any point along the chain without requiring changes to any other part of the chain. For example, a spurious symbol might be injected in the symbol encoder, without affecting the word assembly.

In the preferred embodiment, each processor is implemented as a state machine. It may also be desirable to implement each processor as a separate thread in a multi-threaded computer system. Processors may also include portions for handling analog characteristics of serial bus signals (e.g., analog circuitry).

Figure 5:
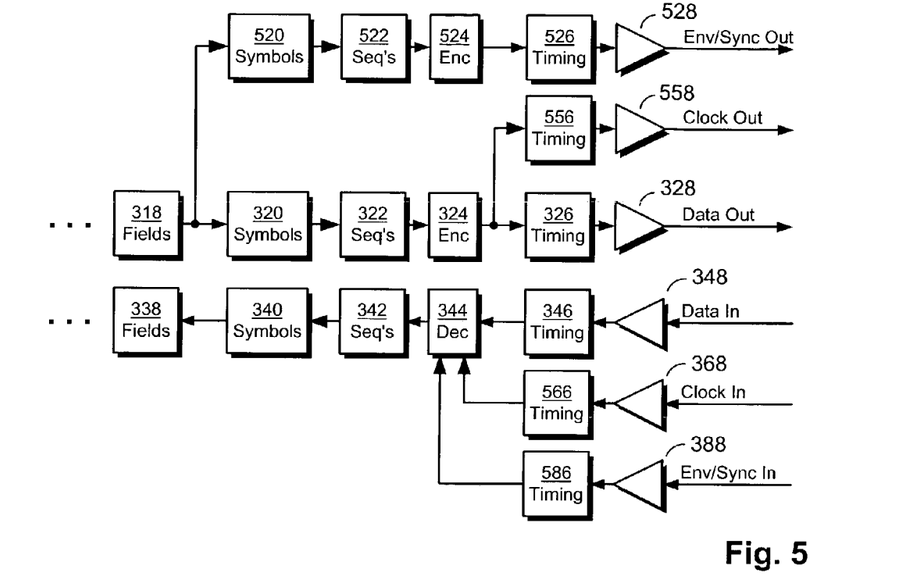
FIG. 5 is a modified view of the bus model of FIG. 3, which shows additional elements for managing clocks, envelope signals, and sync signals.

As shown in FIG. 5, the bus model is easily extendable to include a non-data signals of a bus, such as clocks, syncs, and envelopes. Owing to the segmentation of the bus model into components and the defined interfaces between them, functions for controlling non-data signals are easily linked into the implementation. FIG. 5 shows processing components as shown in FIG. 3, though assembled into a different bus model, and additionally including components controlling non-data signals. The clock output, for example, only needs timing information to be generated, and so only needs to be linked to the final stage before the data timing. Similarly, the envelope or sync output only requires knowledge of the location of the beginning and the end of the transmitted word, information that is available from the field processor 318. Accordingly, env/sync output is provided through symbol processing component 520, sequence processing component 522, encoding component 524, and timing processing component 526, which are linked to the output of field processing component 318. This information can be picked up and processed according to that output's analog characteristics. Using the implementation of the bus model, information can be passed through additional processors to further modify the waveform or to match the rest of the transmitted signal's processing delays. On the receive side, the clock input modifies only when the symbol is decoded, and so it affects only the symbol decoding. Accordingly, a clock input, after passing through an analog receiver 368, is processed in timing processing component 566, which provides its output to decoding processing component 344. The envelope or sync signal only adds additional timing information and so upon reception by analog receiver 388 is processed in timing processing component 586.

The bus model can thus be applied to non-data parts of the bus. The bus model need cover only those parts of the bus unique to that signal, such as voltage or duty cycle. The shared parts of the bus model still apply equally to all, without redundancy. If a field length is modified, the clock and envelope are automatically expanded to match. If the input clock frequency changes, the other stages, which are unaware of timing information, need no modification.

The bus model also simplifies the specification of handshaking behavior. Handshaking signals may modify when data is transmitted, when it is received, or both. They may apply instantaneously, or on the next word, or on the next frame. There may be multiple handshaking signals that control different aspects of the data exchange. Handshaking signals may be unidirectional or bidirectional. Handshaking may even occur as part of the data stream, without additional external signals. Basically, there are as many possible variations in handshaking as there are variations in data transmission.

Figure 6:
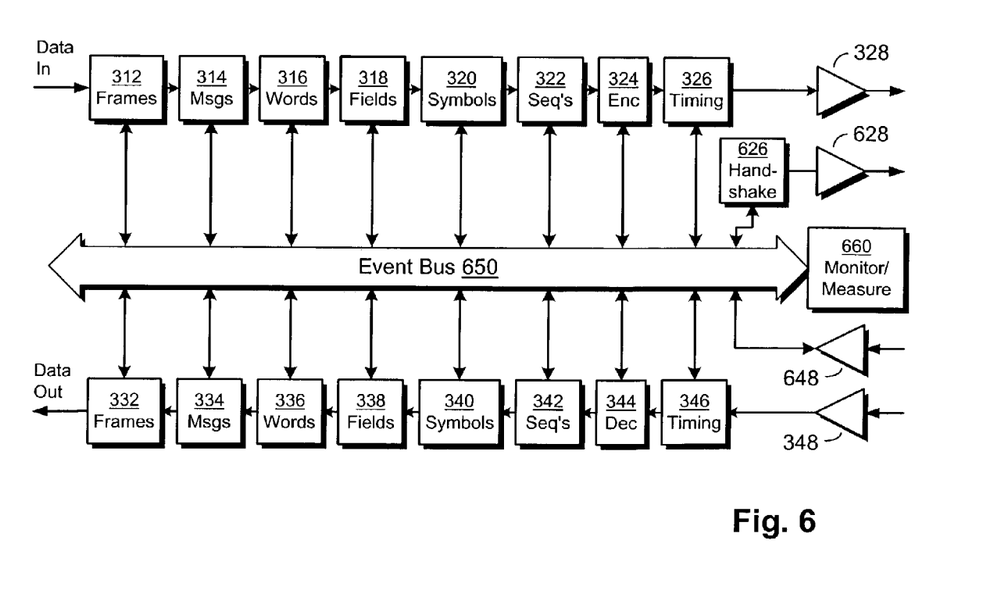
FIG. 6 is a modified view of the bus model of FIG. 3, which shows the event bus and certain handshaking elements.

FIG. 6 shows how simply and flexibly handshaking is implemented in this model. Incoming handshaking information is received by an analog receiver 648 and applied to all of the bus model's components (312-326, 332-346). Outgoing handshaking information is passed through a handshaking component 626 and then outputted onto a serial bus by an analog driver 628. Handshaking information is preferably transmitted and received via an event bus 650, although this is not required. The event bus 650 facilitates communication among the different processors, as well as other components, and is discussed in more detail below.

Referring briefly back to FIG. 4, each processor 410 has another characteristic added to its model: what it does in response to a handshake. It may ignore it, stop, wait for some input from the previous component, or signal the next component. Similarly, an outgoing handshake signal can receive information from any of the bus model's components. Each component has another characteristic in its model, specifying whether it participates in the outgoing handshake, and what would cause an outgoing handshake. It could be a particular bit pattern or a full buffer.

The bus model is also expanded to include an outgoing handshake component 626 that provides an output through analog driver 628. In this way, handshaking behavior may be captured in the bus model and implemented using independent processors, just like any other bus characteristic. And since the handshaking information is fed to and from every component in the bus model, any type of handshaking can interact with any part of the bus model, providing all of the flexibility in handshaking that is achieved elsewhere.

FIG. 6 shows only a single incoming handshake and a single outgoing handshake, but the number of handshakes may be expanded to as many as required. Similarly, handshaking that is part of the data signal, rather than a separate signal, may be output by any of the components and applied as an input to any of the components in the same way.

The flexibility discussed above that stems from providing different processors for different layers of the bus model applies to handshakes as well. The component that uses the handshake information is indifferent to its source. The component that produces the handshake information is indifferent to its destination.

Certain outputs from the processing components may be grouped, for convenience, into the event bus 650. The event bus 650 facilitates communication of "events" in the bus model, such as the beginning of a field, the end of a transmitted word, or the beginning of a receive message. The event bus may be used to aggregate component I/O without increasing the complexity of the system.

FIG. 6 shows how the event bus may be used. Every processing component contributes one or more of its outputs to the event bus, and each processing component has access to the entire event bus.

Part of the bus model's appeal comes from the fact that each component may be ignorant of the activities of the other components. This is what allows one parameter to be changed without affecting the rest of the model. But there is a limited set of components—including those implementing handshaking, collision detection, and a number of others—which requires knowledge of when other components are doing something, even if they do not need to know the details of what they are doing. The event bus simplifies the description and discussion.

In the implementation of the model, the event bus may also be used to export events to external instruments, which may use the events for measurements, interrupts, etc. Similarly, events may be imported from external instruments, allowing bus behavior to be controlled by non-bus operations. This is valuable when the bus is part of a complex system, which integrates discrete analog and digital functions with the bus. For example, a bus transmission can be triggered by an alarm signal from an external heat detector.

Preferably, the bus model is implemented as a test instrument for performing testing functions on equipment that interfaces with any of a variety of different serial busses. The layered structure of the bus model facilitates the description of functional tests, as well as the development of standard testing functions such as fault injection and margining.

The ability independently to vary bus parameters such as field length, word type, parity, and so forth, readily permits the injection of faults. A fault is nothing more than a parameter that was varied, either for a single event (one word, one symbol, etc.) or permanently. If the object is to test a bus, not just control a bus, the invention inherently incorporates the ability to inject faults.

Just as faults may be injected, the bus model allows failures to be easily detected and categorized. Each component of the model has a list of expected behaviors for its inputs from other components. If the inputs exhibit behavior not part of the expected list, or in the wrong sequence, the component can generate a fault output. Because each component performs a limited and independent function, the fault is automatically categorized according to that function.

For example, errors detected by the bit decoder are bit encoding errors. Errors detected by the message assembler are message assembly errors. Each component can add additional detail to its fault detection, as desired, but the advantage of the invention is the inherent categorization of faults afforded by the bus model.

The model also allows faults to be anticipated and handled. By extending the bus model to include what an original bus specification would consider faulty behavior, this behavior can instead be accepted and incorporated into the received data. This allows a higher-level layer to take specific action based on a fault, rather than creating an out-of-model event that requires data to be discarded as part of its recovery. In other words, faults can become normal, but tagged, behavior. If the implementation of this model is used to test, rather than just emulate a bus, fault anticipation can accept expected, induced errors.

Some faults, such as a bus collision, require early detection and immediate action. For example, a bus collision may require that the transmitter be turned off. The separation of functions in the invention allows the fault to be detected at the earliest possible stage, and allows the action (based on the collision event on the event bus) to be specified for the proper transmitter stage. If the transmitter needs to tristate immediately, it is part of the analog output's action to tristate when the collision event occurs. If instead the bus requires that the currently transmitted word complete, the same collision event is used by an earlier processing component to terminate at the end of the current word.

The bus model also allows monitoring, control, and measurement of bus performance parameters that involve multiple processing components. FIG. 6 shows a specific example of the general type of monitoring, control, and measurement that the bus model readily allows. As shown in FIG. 6, a monitor/measure component 660, which could be part of the bus model or some external instrument, accepts inputs, preferably via the event bus 650, from both the transmitter timing processor 326 and the receiver timing processor 346, to perform measurements or control based on the time between the two. This functionality is independent of the operation of the transmitter and receiver timing. In fact, the processors 326 and 346 need not even be "aware" of the measurement. Thus, the bus model allows observability and control without adding complexity or extra functions to the processing components.

Alternatives

Having described one embodiment, numerous alternative embodiments or variations can be made. For instance, although a particular form of bus model is shown having certain designated layers (i.e., frames, messages, words, etc.), the invention is not limited to a bus model having these specific layers. The identities of the layers can be varied and are not critical to the invention.

In addition, a bus emulator need not include all the components shown. For example, RS-232 does not employ frames, messages, and sequence dependencies in its bus protocol. A simpler and less expensive bus emulator for RS-232 could thus omit the processors associated with these unused components and save cost.

As shown and described, the components of the bus model are preferably implemented with "independent" processors. These processors could be implemented as physically separate hardware or separate software programs. Nothing in this definition of "independent" should be construed, however, as preventing different processors from being formed on the same chip, in the same software module, or from sharing certain common hardware or software. Therefore, although the different processors provide a measure of independent functionality, they need not be physically or structurally separate.

For some applications, it may be advantageous to combine processors for outgoing and incoming data. Referring back to FIG. 3, the frames processor 312 for outgoing data could be combined with the frames processor 332 for incoming data. Other processors performing corresponding functions could be similarly combined.

Although "serial busses" are generally thought to describe wire transmissions, the term as used herein also describes wireless, fiber optic, RF signaling, and other types of communications. Multidrop busses such as Ethernet, ARINC-629, and TTP are included, as well. The term "serial busses" includes not only busses employing single-ended signals, but also busses employing differential signals (i.e., signals that come in pairs and vary in opposition with each other). In addition, the term "serial busses" includes both unidirectional and bidirectional busses, as well as half-duplex and full-duplex busses.

The bus model of FIG. 3 can readily be expanded in both width and depth. It could include multiple data streams, or could include higher-level data organization layers beyond frames and messages.

Although the bus model has been described primarily in relation to bus emulation and testing, the model can also be used in a pure simulation environment. For example, a test instrument embodying the bus model can be simulated partly or wholly in software to facilitate the development of test programs for serial bus devices.

Therefore, while the invention has been particularly shown and described with reference to the preferred embodiments thereof, it will be understood by those skilled in the art that various changes in form and detail may be made therein without departing from the spirit and scope of the invention.

What is claimed is:

1. An instrument for interacting with a serial bus, comprising:
    an interface for coupling a signal between the serial bus and the instrument; and
    a plurality of processors for processing the signal in different communication layers of a generic bus model, the communication layers being in a hierarchy and each communication layer defining communications on the serial bus in terms of at least one lower communication layer in the hierarchy, each processor being associated with a communication layer,
    wherein the plurality of processors is arranged with processors of the plurality of processors connected in a sequence according to the hierarchy, each processor being adapted to receive data at a data input, perform processing steps on the data associated with a communication layer of the generic bus model, and output data at a data output, whereby the signal is processed in processors of the plurality of processors according to the sequence, and
    wherein at least one of the plurality of processors has at least one adjustable parameter for defining at least one characteristic of the communication layer associated with the at least one processor, the at least one adjustable parameter for configuring the instrument for interacting with different types of serial busses.

2. The instrument as recited in claim 1, wherein at least one of the plurality of processors further comprises a record of at least one expected behavior of data received at the data input of the at least one processor.

3. The instrument as recited in claim 2, wherein said at least one of the plurality of processors further comprises means for signaling a failure responsive to actual behavior of its input data not matching expected behavior of the input data of the at least one processor.

4. The instrument as recited in claim 1, further comprising means for injecting a fault by varying the at least one adjustable parameter.

5. The instrument as recited in claim 1, wherein at least one of the plurality of processors further comprises a handshaking input for receiving incoming handshaking information from a serial bus.

6. The instrument as recited in claim 5, wherein at least one of the plurality of processors further comprises a record of actions to take in response to the handshaking information.

7. The instrument as recited in claim 6, wherein at least one of the plurality of processors further comprises means for detecting handshaking information on input data received at the data input of the at least one processor.

8. The instrument as recited in claim 1, wherein at least one of the plurality of processors further comprises a handshaking output for providing outgoing handshaking information to a serial bus.

9. The instrument as recited in claim 1, wherein at least one of the plurality of processors generates at least one event to be conveyed to another of the plurality of components.

10. The instrument as recited in claim 1, wherein a communication layer comprises one of a timing, waveshape, encoding, sequencing, symbol, field, word, message, or frame.

11. The instrument as recited in claim 1, wherein the at least one adjustable setting comprises a length of the communication layer, the type of data contained in the communication layer, the position of the communication layer in the signal, or whether to include the communication layer in calculations for error correction.

12. The instrument as recited in claim 1, wherein at least one of the plurality of processors is implemented at least in part as a software component for exercising a software simulated serial bus.

13. The instrument as recited in claim 1, wherein the plurality of processors comprises a first plurality of processors for processing data to be outputted to a serial bus and a second plurality of processors for processing data to be inputted from the serial bus,
    wherein each of the first plurality of components handles a different communication layer of the bus model, and
    wherein each of the second plurality of components handles a different communication layer of the bus model.

14. The instrument of claim 1, wherein the communication layers comprise physical communication layers.

15. The instrument of claim 14, wherein a physical communication layer is one of voltage level, transmission rate, and wave shape.

16. An electronic apparatus for exercising serial busses of different types, comprising:
    an analog driver having a data input for receiving data indicative of an outgoing serial bus signal and an output for providing the outgoing serial bus signal in response to the data;
    an analog receiver having an input for receiving an incoming serial bus signal and an output for providing data indicative of the incoming serial bus signal;

a plurality of processors coupled to the analog driver and the analog receiver, each for processing a communication layer of serial bus communication in at least one of an incoming and outgoing direction, the plurality of processors collectively receiving as an input data from the output of the analog receiver and/or providing as an output data at the input of the analog driver, the communication layers being in a hierarchy and each communication layer defining communications on the serial bus in terms of at least one lower communication layer in the hierarchy, and each processor being related to a communication layer;

wherein the plurality of processors is arranged with processors of the plurality of processors connected in a sequence according to the hierarchy, each processor being adapted to receive data at a data input, perform processing steps on the data related to a communication layer of a generic bus model, and output data at a data output, whereby a signal is processed in processors of the plurality of processors according to the sequence, wherein each of the plurality of processors has at least one adjustable parameter for defining at least one characteristic of the communication layer related to the at least one processor, the at least one adjustable parameter for configuring the electronic apparatus for interacting with different types of serial busses.

17. The electronic apparatus as recited in claim 16, wherein establishing each at least one adjustable parameter to different values enables the electronic apparatus to exercise equipment on any of the plurality of different types of serial busses.

18. The electronic apparatus as recited in claim 16, wherein the plurality of processors comprises:
a first plurality of processors for processing data to compose outgoing data to be applied to the analog driver; and
a second plurality of processors for processing signals from the analog receiver to be stored in the memory.

19. The electronic apparatus as recited in claim 16, wherein a communication layer comprises one of a timing, waveshape, encoding, sequencing, symbol, field, word, message, or frame.

20. The electronic apparatus as recited in claim 16, wherein the analog driver is a first analog driver and further comprising:
a second analog driver for providing a clock signal to a serial bus; and
at least one additional processor having an output coupled to the second analog driver for controlling timing characteristics of the clock signal.

21. The electronic apparatus as recited in claim 16, wherein the analog receiver is a first analog receiver and further comprising:
a second analog receiver for receiving a clock signal from a serial bus; and
at least one additional processor having an input coupled to the second analog receiver for interpreting timing characteristics of the clock signal.

22. The electronic apparatus as recited in claim 16, wherein the analog driver is a first analog driver and further comprising:
at least one additional analog driver for providing at least one of an envelope and sync output signal to a serial bus; and
at least one additional processor having an output coupled to each at least one additional analog driver for controlling characteristics of said at least one of the envelope and sync output signal.

23. The electronic apparatus as recited in claim 16, wherein the analog receiver is a first analog receiver and further comprising:
at least one additional analog receiver for receiving at least one of an envelope and sync input signal from a serial bus; and
at least one additional processor having an input coupled to said at least one additional analog receiver for interpreting characteristics of said at least one of the envelope and sync input signal.

24. The electronic apparatus as recited in claim 16, wherein the analog driver is a first analog driver and further comprising:
another analog driver for providing outgoing handshaking signals.

25. The electronic apparatus as recited in claim 24, wherein the analog receiver is a first analog receiver, and further comprising:
another analog receiver for receiving incoming handshaking signals.

26. The electronic apparatus as recited in claim 25, wherein the other analog receiver for receiving incoming handshaking signals has an output coupled to at least one of the plurality of processors for conveying handshaking information.

27. The electronic apparatus as recited in claim 25, wherein at least one of the plurality of processors has an output for providing a handshaking signal, and further comprising:
a handshaking processor having at least one input for receiving each such handshaking signal and having an output coupled to the other analog driver for providing outgoing handshaking signals.

28. The electronic apparatus as recited in claim 25, wherein the handshaking processor has an additional input coupled to the output of the other analog receiver for receiving incoming handshaking signals.

29. The electronic apparatus as recited in claim 16, wherein at least one of the plurality of processors has an output for specifying an event related to the characteristic of serial busses that it manages, and at least one of the plurality of processors has an input for receiving events outputted by at least one other of the plurality of processors.

30. The electronic apparatus as recited in claim 24, further comprising an event bus for communicating events among different ones of the plurality of processors.

31. The electronic apparatus as recited in claim 30, wherein the event bus is connectable to external instruments for communicating any of measurements, interrupts, and control signals.

32. The electronic apparatus as recited in claim 30, further comprising:
a handshaking processor for processing handshaking signals,
wherein the events communicated by the event bus include the handshaking signals.

33. The electronic apparatus of claim 16, further comprising means for injecting a fault by varying the at least one adjustable parameter.

34. A method of testing equipment for any of a variety of different types of serial busses, comprising:
specifying values related to characteristics of a serial bus with which the equipment is to be operated;

programming a plurality of processors with the specified values, each processor assigning at least one value to at least one adjustable parameter of the processor; and exercising the equipment based at least in part on data processed in the plurality of processors, the processing being based at least in part on the parameters programmed, wherein each of the plurality of processors is for processing a different communication layer of a serial bus protocol, the communication layers being in a hierarchy and each communication layer defining communications on the serial bus in terms of at least one lower communication layer in the hierarchy, the plurality of processors is arranged with processors of the plurality of processors connected in a sequence according to the hierarchy, whereby a signal is processed by processors of the plurality of processors according to the sequence, and different parameters of the plurality of parameters are used for defining at least one characteristic of the communication layer related to the at least one processor to specify protocols for different serial bus types.

35. The method as recited in claim 34, wherein the step of specifying comprises identifying one of a group of serial bus types having associated values that have been pre-stored.

36. The method as recited in claim 35, wherein the step of specifying further comprises varying at least one of the values to accommodate equipment for a bus that is similar to but not identical to one of the serial bus types having associated parameters that have been pre-stored.

37. The method as recited in claim 34, wherein the step of exercising the equipment comprises injecting faults by varying at least one of the parameters from a nominal value.

38. The method as recited in claim 34, wherein the step of exercising the equipment comprises at least one of the plurality of processors comparing input data provided to the processor with expected behavior to determine whether a failure has occurred.

39. The method as recited in claim 38, wherein the step of exercising the equipment further comprises categorizing a failure responsive to the identity of the processor that reports the fault.

40. The method as recited in claim 34, wherein different processors have different parameters, and the step of exercising the equipment comprises varying at least one of the parameters from a nominal value to examine the behavior of the equipment near the margins of the specification of the at least one parameter.

41. The method as recited in claim 34, wherein the step of exercising the equipment comprises:

at least one processor generating an output indicative of conditions at the input data of the at least one processor, and monitoring the output indicative of the conditions to determine activities performed by the at least one processor.

42. The method of claim 34, wherein the act of exercising the equipment comprises receiving a signal from the serial bus and generating a signal on the serial bus.

43. A method for emulating different types of serial busses, comprising:

representing a serial bus communication as comprising a plurality of communication layers of a generic bus model, the communication layers being in a hierarchy and each communication layer defining communications on the serial bus in terms of at least one other communication layer in the hierarchy;

processing, for a first type of serial bus, serial bus data for each of the plurality of communication layers with a respective independent processor of a plurality of processors, the plurality of processors being arranged with processors of the plurality of processors connected in a sequence according to the hierarchy whereby a signal is processed by processors of the plurality of processors according to the sequence;

adjusting a plurality of parameters for defining at least one characteristic of the communication layer of the independent processors for interacting with a second type of serial bus; and processing, for the second type of serial bus, serial bus data for each of the plurality of communication layers with the respective independent processor.

44. The method of claim 43, wherein a communication layer is one of a timing, waveshape, encoding, sequencing, symbol, field, word, message, or frame.

* * * * *

UNITED STATES PATENT AND TRADEMARK OFFICE
CERTIFICATE OF CORRECTION

PATENT NO. : 7,343,279 B2
APPLICATION NO. : 10/325070
DATED : March 11, 2008
INVENTOR(S) : Eric L. Truebenbach et al.

It is certified that error appears in the above-identified patent and that said Letters Patent is hereby corrected as shown below:

On the title page, Related U.S. Application Data, item (60) should read:

-- (60) Related U.S. Application Data
Provisional Application No. 60/400,176, filed on August 1, 2002. --

In the claims:

Col. 13, claim 16, line 6, "andlor" should read -- and/or --.

Signed and Sealed this
Second Day of July, 2013

Teresa Stanek Rea
*Acting Director of the United States Patent and Trademark Office*